US007949702B2

(12) United States Patent
McGee et al.

(10) Patent No.: US 7,949,702 B2
(45) Date of Patent: May 24, 2011

(54) METHOD AND APPARATUS FOR SYNCHRONIZING COOKIES ACROSS MULTIPLE CLIENT MACHINES

(75) Inventors: Jason Robert McGee, Morrisville, NC (US); Christopher C. Mitchell, Raleigh, NC (US); Michael John Morton, Cary, NC (US); Brent A. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2152 days.

(21) Appl. No.: 10/043,355

(22) Filed: Jan. 9, 2002

(65) Prior Publication Data

US 2003/0131045 A1    Jul. 10, 2003

(51) Int. Cl.
*G06F 15/16* (2006.01)
(52) U.S. Cl. ........ 709/201; 709/225; 709/227; 709/219; 702/188; 705/27
(58) Field of Classification Search .................. 709/225, 709/227, 219, 217, 201, 221; 702/188; 705/27
See application file for complete search history.

(56) References Cited

U.S. PATENT DOCUMENTS

| 5,594,921 | A | * | 1/1997 | Pettus | 710/11 |
|---|---|---|---|---|---|
| 5,832,489 | A | | 11/1998 | Kucala | 707/10 |
| 5,875,296 | A | | 2/1999 | Shi et al. | 395/188.01 |
| 5,893,116 | A | | 4/1999 | Simmonds et al. | 707/201 |
| 5,954,798 | A | | 9/1999 | Shelton et al. | 709/224 |
| 5,974,238 | A | | 10/1999 | Chase, Jr. | 395/200.78 |
| 6,000,000 | A | | 12/1999 | Hawkins et al. | 707/201 |
| 6,167,358 | A | * | 12/2000 | Othmer et al. | 702/188 |
| 6,185,567 | B1 | | 2/2001 | Ratnaraj et al. | 707/10 |
| 6,195,705 | B1 | | 2/2001 | Leung | 709/245 |
| 6,389,460 | B1 | * | 5/2002 | Stewart et al. | 709/217 |
| 6,473,740 | B2 | * | 10/2002 | Cockrill et al. | 705/27 |
| 6,584,493 | B1 | * | 6/2003 | Butler | 709/204 |
| 6,678,731 | B1 | * | 1/2004 | Howard et al. | 709/225 |
| 6,748,426 | B1 | * | 6/2004 | Shaffer et al. | 709/219 |
| 6,779,033 | B1 | * | 8/2004 | Watson et al. | 709/227 |
| 6,934,736 | B2 | * | 8/2005 | Sears et al. | 709/203 |

OTHER PUBLICATIONS http://www.jsonline.com/bym/tecg/news/jun01/bugs19061801.org.*

* cited by examiner

*Primary Examiner* — Tammy T Nguyen
(74) *Attorney, Agent, or Firm* — Jeanine S. Ray-Yarletts (57) ABSTRACT

In accordance with the invention, cookies are automatically synchronized across multiple client machines on a network. A user registers all of the client machines for which he desires cookie synchronization under a single account with a cookie synchronization server. Each of the client machines is equipped with software that monitors all changes made to cookies at that machine and sends notifications of the changes to the cookie synchronization server. The cookie synchronization server stores the cookie change information in a log and sends it out to the other client machine in the account, which then update their cookies accordingly.

33 Claims, 3 Drawing Sheets

METHOD AND APPARATUS FOR SYNCHRONIZING COOKIES ACROSS MULTIPLE CLIENT MACHINES

FIELD OF THE INVENTION

The invention pertains to synchronization of cookies across multiple client machines on a network.

BACKGROUND OF THE INVENTION

The Internet is a vast collection of computing resources, interconnected as a network, from sites around the world. It is used every day by millions of people. The World Wide Web (referred to herein as the "Web") is that portion of the Internet that uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

The user working in a Web environment will have software running on his computer to allow him to create and send requests for information, and to see the results. These functions are typically combined in a software package that is referred to as a "Web browser" or "browser". After the user has created his request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer.

This is an example of a client-server model of computing, where the machine at which the user requests information is referred to as the client, and the computer that locates the information and returns it to the client is the server. In the Web environment, the server is referred to as a "Web server".

The HTTP communications protocol uses a request/response paradigm, where the electronic messages sent between communicating computers can be categorized as either requests for information, or responses to those requests, as discussed above.

Requests typically take the form URLs (Universal Resource Locators). A URL is essentially an address of a server on the Internet and the name of the particular file stored at that server that is requested. It will be understood by those of skill in the art that, although the preceding sentence refers to files being "stored" at servers, many servers are smart enough to actually generate requested files in response to receipt of a request by pulling data from various databases. Other server or server systems do, in fact, have files stored therein which are retrieved and returned in response to a request for such files.

HTTP does not provide for maintaining any type of state information about the communications, instead treating each request/response pair as a separate and unrelated transaction. However, there are many cases for which it is desirable to associate multiple http requests from a single client to a single server with each other so as to be able to maintain state information.

Some example scenarios where state information is an absolute necessity include on-line shopping, searching with successive refinement of search terms, and gathering user profile information. In on-line shopping, a user typically accesses a seller's on-line catalog, which will be displayed to him as some number of Web pages (where a "Web page" is a file compromising the information displayable in response to a user's request). Typically, the user can display a separate page of information related to each product, to read about the details of that product. Each time the user requests to see a page, a separate HTTP request is typically sent to the Web server where the seller's product catalog is stored. This request indicates that data for a specific product should be gathered and sent to the client machine for display. When the user wishes to order a product, he indicates his selection by clicking on an "Order" button of some type, using a mouse, for example. This causes another request message to be sent to the server, where the request indicates that this is an order for the particular item. Without the ability to maintain state information, each of these requests would be treated as unrelated to the others. There would be no efficient way to collect orders for more than one item into one large order. Further, there would be no efficient way to allow the user to enter his name, address, credit card number, etc. only one time, and have that information apply to all the ordered items.

In addition, it also is frequently desirable to be able to maintain state information across multiple visits by a particular individual to a particular Web site. For instance, many individuals visit one or more particular Web sites repeatedly. It is often desirable to determine the identity of the particular individual visiting the site so that certain information about that particular user that had been gathered during a previous visit to the Web site can be applied to the current visit. Merely as an example, it may be desirable for a retail Web site to store all of the information that it typically needs to process a purchase order by an individual and associate that information with the individual every time he or she visits the Web site. Then the individual will not need to re-enter the same information, such as name, credit card No., billing address, shipping address, etc., every time he or she visits the Web site and purchases an item.

Accordingly, ways have been developed outside of the http protocol itself for maintaining such state information. One of the earliest ways developed for doing this was the use of cookies. Cookies are small data files that a server sends to a client machine and that the client's Web browser knows to store in a designated cookie folder or in the browser memory at the client computer. Thereafter, when that client sends a http request for a Web page to that server, the client's Web browser software sends the cookies associated with that URL to the server. The cookie might contain any particular information that the Web site operator feels the need to have in order to better service its customers. As an example, many Web sites allow individual clients to customize Web pages, such as a daily, electronic, newspaper containing only those articles that meet certain criteria selected by the customer. Those criteria can be stored in a cookie. Frequently, the cookie contains merely a session ID. A session ID is a unique character string, independent of the IP address, that uniquely identifies the particular client machine. In such a case, the Web site operator may store on its own server the actual information of interest associated with that session ID and retrieve that information when it receives a request containing a cookie bearing that particular session ID. Every computing device that communicates via the Internet, including client machines and servers, is assigned a unique IP (Internet Protocol) address. Client machines that have a direct connection to the Internet as well as most servers typically have a permanent IP address. Client machines that connect to the Internet through an ISP, however, commonly are assigned a new IP address by the ISP, termed a dynamic address, each time they log on to the Internet. In either scheme, the IP address uniquely identifies a machine, rather than the particular individual.

Persons of skill in these arts will recognize that other mechanisms for storing state data are known. However, the use of cookies is probably the most ubiquitous of the various mechanism in use today.

Computers have become so commonplace that it is not unusual for a single individual to have several computing devices from which that individual normally accesses the Internet. This is particular true in light of the recent proliferation of portable, wireless computing devices that are designed to connect to the Internet. For instance, it would not be uncommon for a single individual to have a desktop computer at home, a second desktop computer at work, a portable notebook computer, a wireless palm top computing device, and an Internet-enabled cellular telephone, all of which are regularly used to access content via the Internet.

Since cookies are stored locally at each client machine, each time an operator visits a Web site from a different machine, a new cookie must be generated by the server and sent to the new client machine. Accordingly, the user must re-enter whatever information is required the first time he access a particular Web site from a new client machine. Even when the cookie contains only a session ID, the server must generate a new cookie for each new machine. This is because the session ID identifies the machine, not the individual.

Further, cookies may be revised or otherwise updated periodically. For instance, a Web site server may detect patterns in the Web surfing habits of the individual and create cookies that the server can use to improve the user's surfing experience through that Web site. Again, however, the cookies are associated with a machine, not an individual. Therefore, whenever the individual accesses the Web site from a different machine, the cookies at that machine may be different from the cookies stored at the other machine, thus detracting from the user's Web surfing experience.

Accordingly, it is object of the present invention to provide an improved method and apparatus for Web browsing.

It is a further object of the present invention to provide a method and apparatus for synchronizing cookies across a plurality of client machines.

SUMMARY OF THE INVENTION

In accordance with the invention, a server is maintained on a network for storing cookie change information for one or more users that register for cookie synchronization service with the server. Each user opens an account with the cookie synchronization service provider and registers all of the client machines for which he or she desires cookie synchronization under that account. Each of these client machines is equipped with software that monitors all changes made to cookies at that machine.

When a change to a cookie at a client machine is detected, the client sends a notification to the cookie synchronization server. The notification includes sufficient information to at least identify the account to which the client machine belongs and allow the cookie synchronization server to re-create the cookie. Preferably, the client simply sends the entire cookie and an account ID within the request.

The cookie synchronization server stores the changed cookie information and subsequently sends it back out to each other client machine in the account. The cookie synchronization server may send out the information to the registered client machines responsive to receipt of requests for cookie change information from the other client up machines that are members of the account. The client machines update their cookies in accordance with the received cookie change information and acknowledge receipt of the changed cookie information. Thus, the server can keep track of which client machines have the latest version of each cookie so that it can send only those cookies that the client machine does not already have to a requesting client machine.

DETAILED DESCRIPTION OF THE INVENTION

Figure 1:
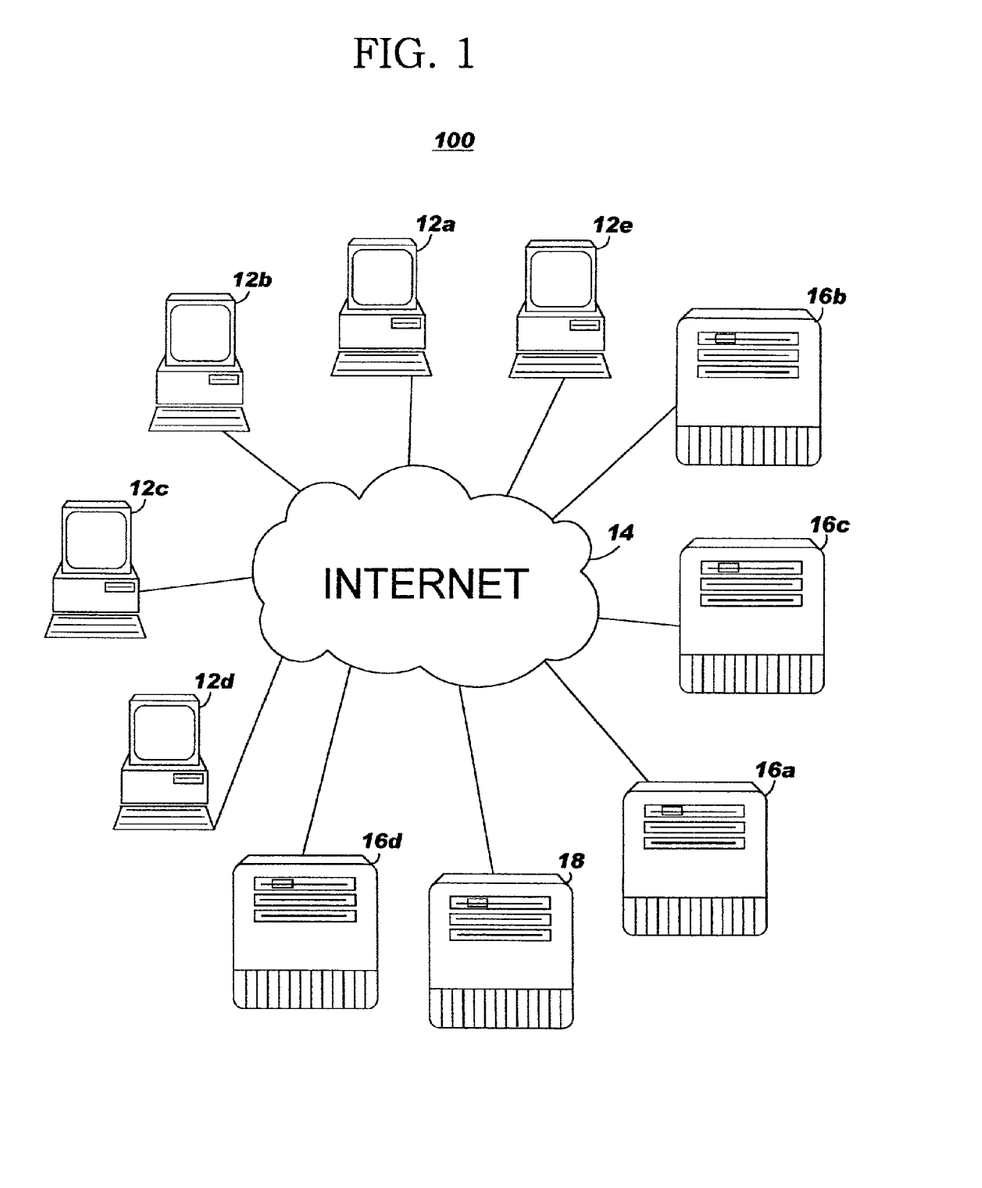
FIG. 1 is a block diagram illustrating the basic components involved in communication over a distributed network, such as the Internet, in accordance with the present invention.

FIG. 1 is a block diagram of a network, such as the Internet, in which the present invention is implemented. The network is shown at 14 and comprises a series of interconnected computers, routers, and switches (not shown) that essentially allows any computer on the network to communicate with any other computer on the network. Computers 12a through 12e are client computers that issue requests via the Internet to server machines on the Internet. Computers 16a through 16d are servers which serve information to client machines responsive to requests received from those client machines via the Internet. Those of skill in the art will understand that some Web site operators maintain a plurality of server machines (sometimes called a server farm) to maintain a single Web site. On the other hand, other companies, such as Web hosting companies, might maintain multiple Web sites for multiple customers using a single physical server machine. In order not to obfuscate the invention, we shall assume that each server 16a-16d is operated by a single Web site operator.

Server 18 is a cookie synchronization server in accordance with the present invention as described herein and is also coupled to the Internet and can be accessed by the client machines 12 via the Internet 14.

Let us assume a single individual accesses the Internet through any one of client machines 12a, 12b and 12c. A cookie synchronization service provider operates cookie synchronization server 18 and offers a cookie synchronization service to individuals who register with that operator. Each individual who registers is assigned a unique account ID. The individual registers under that account ID each client machine that he or she wishes to have cookies that are synchronized with each other. The server assigns a unique session ID to each registered client machine and each machine stores its session ID in memory so that it can retrieve it when needed to identify itself to the cookie synchronization server. The server maintains a database of the accounts and the client machines that are members of each account. Registration can be performed by telephone, by mail, in-person or via the Internet.

In at least one embodiment, the user registers each client machine by logging on to a Web site maintained by the cookie synchronization service provider from each machine that he wishes to register. For instance, the cookie synchronization service provider can provide the individual with a unique account ID during registration of a first client machine. The individual can then log onto the Web site with each additional client machine that is to be a member of the account. A page will prompt the individual to enter the account ID in a particular field of a form and the server can then assign a unique session ID to that machine and store that session ID in a database as a member of that account. It also informs each client machine of its unique session ID so that the client machine can store the session ID and report it to the cookie synchronization server as needed when updating its cookies. This is done only once for each machine that is to be a member of the account.

Each registered client machine is provided with cookie synchronization engine software that will carry out cookie synchronization in accordance with the present invention as described herein. In at least one preferred embodiment of the invention, at the time the user registers each client machine by logging on to the Web site of the cookie synchronization service provider, he or she is also instructed to download and setup this software in that machine. Alternately, the cookie synchronization software can be provided to the individual on a computer readable storage medium such as a floppy disk, or CD ROM. The cookie synchronization engine can be a plug-in module to the browser program.

The cookie synchronization engine performs two primary tasks, namely, 1) sending cookie change information to the cookie synchronization server 18 and 2) handling cookie change information received from the cookie synchronization server 18. Each of these tasks, of course, comprises a plurality of sub tasks. For instance, the task of sending cookie change information to the cookie synchronization server includes detecting when a cookie is changed. In the terminology of this specification, the term "change" includes the creation of new cookies, the deletion of preexisting cookies, the changing of information contained in cookies or any other possible change to a cookie. In one preferred embodiment, all cookies are stored in a designated folder and the software detects whenever any information is written to that folder.

The engine sends the cookie change information to the cookie synchronization server 18. This can be done in accordance with any number of schemes. For instance, the engine can cause the client machine to send an HTML request containing the cookie (as changed) to the cookie synchronization server 18 responsive to and immediately after each change is detected. In an alternative embodiment, the engine can send such requests at periodic intervals, the requests including all of the cookie changes since the last request was sent to the cookie synchronization server 18. In another embodiment, the request can be sent responsive to the user of the client machine logging off of the Internet. In this embodiment, when the user enters an instruction to log off the Internet (such as by operation of a mouse or a keyboard), the engine sends out the request to the cookie synchronization server 18 before the browser actually logs off.

In another embodiment, these last two schemes can be combined. For instance, such requests can be sent to the cookie synchronization server 18 at periodic intervals and immediately before the client machine logs off the Internet. Of course, the engine should be designed so as not to send any request unless a change has actually been made to a cookie at the client machine since the last time it sent cookie change information to server 18.

In an even further embodiment, cookie change requests can be sent only when the operator manually indicates that they be sent. In such embodiments, the cookie synchronization engine may generate reminders on the screen notifying the operator that cookies have been changed and asking if the operator would like to send the cookie change information to the cookie synchronization server.

In another alternate embodiment, cookie change information corresponding to a particular Web site can be sent to server 18 when the client machine exits that Web site.

In at least one preferred embodiment, the cookie synchronization engine software also sends to server 18 the time that each of the changed cookies was changed. Alternately, and especially in connection with embodiments where each time a cookie is changed a request is immediately sent to server 18, no time information needs to be sent. Instead, server 18 can simply log in the time that the request was received. The request also should contain the account ID so that server 18 knows which account is at issue.

Like the cookie synchronization engine at the client machines, server 18 also can be considered to perform two principal tasks, those tasks being the complementary tasks to those performed by the cookie synchronization. The first task is to receive and store all cookie information sent to it in a database/log. Each entry in the log should include the cookies (or at least sufficient information from which the server can generate the cookie), the account ID (or at least sufficient information from which the server can determine the account), the time of the cookie change (or, at least, the time that it was received by the server 18), and preferably, the session ID of the client machine from which it was received. If the client machine session IDs are maintained in the log, then it may be preferable to eliminate the account ID from the entry, since it can be determined at the server from the identity of the client machine and the database in which the list of clients in each account is maintained. In addition to enabling the server to determine the corresponding account, the identity of the client machine from which a cookie update was received is useful to the server in terms of keeping track of which clients in an account sent in which updated cookie information. By tracking this information in a database, the server can avoid wasting resources sending change information about a cookie to the client that sent it in (and thus already has that information and does not need it again).

In an even further refinement of the invention, described more fully below, the server may maintain a separate database of information as to, not only which client machines sent in which cookie updates, but also which client machines already have received which cookie updates from the cookie synchronization server's log.

The server's second principal task is sending the cookie change information in the log corresponding to each account to all of the client machines registered under that account. The server 18 can send this information out in accordance with any number of schemes. For instance, each log entry may be handled individually or multiple log entries for a given account can be collected and sent together.

Before the server sends out any cookie change information, it preferably first determines which client machines already have the information contained in any of the log entries so as not to send out redundant information. There are many ways in which this can be accomplished. As one example, the server can maintain as part of the log entry or in a secondary database a record of the particular client machine from which the data in each log entry was received. Further, in the secondary database (or, alternately, in an even further database), the server can maintain a record of the times at which each client machine last received a cookie change update from the server. The server can run an algorithm that correlates information in the log with information contained in the secondary database(s) to generate, with respect to any registered client machine, a list of all log entries that meet the following criteria: (1) they pertain to the particular account of which the requesting client machine is a member, (2) they were received by the server since the last time the server sent cookie change information to that client machine, and (3) they were not received by the server from that particular client machine. The server would send out cookie updates corresponding only to those entries that meet all three criteria. This enhancement is not a requisite since sending information to client machines that already have the information will not lead to errors. However, sending redundant information is a waste of system resources.

The server should also run an algorithm to delete from the log any entries that are outdated. A cookie change log entry may be considered outdated if (1) it has been received by all client machines in the corresponding account or (2) the cookie contained in a log entry has been subsequently updated (as evidenced by a subsequent log entry containing the same cookie name).

In a simple embodiment, the server 18 may send the cookie change information pertaining to an account to the client machines registered under that account at periodic intervals without waiting for requests for cookie change information. Each client machine should acknowledge receipt of the cookie change information so that the server will know which machines have been updated.

The aforementioned scheme is inefficient and not preferred, especially if any of the machines in the account do not have a dedicated, full-time, connection to the network (as would most likely be the case for most client machines, and especially portable and/or wireless client machines). In such cases, the server 18 would frequently be sending information to machines that are not even coupled to the network at that time.

In a more preferred embodiment, the server 18 sends out cookie change information only in response to receipt of a request for cookie change information from a client machine. The client machines can send out requests for cookie change information in accordance with any number of possible schemes. For instance, each client machine may send out a request to server 18 for updated cookie information at periodic intervals while it is coupled to the network. Alternately or in addition, it may send a request for cookie change information each time it logs on to the network.

In an even further embodiment, each client machine may send a request for updated cookie information whenever it visits a Web site for which it already has cookies. In one such embodiment, the client machine can simply request cookie changes, if any, pertaining to that particular Web site. However, preferably, whenever a client machine requests cookie change information from server 18, the server should send all cookie change information in that account in order to minimize the number of exchanges between the server 18 and client machine.

The client machines that receive such cookie change information update the relevant cookies accordingly.

In other embodiments of the invention, the cookie change information need not be stored at a server on the network. For instance, where only two devices are to be synchronized and the two devices can be directly coupled to each other, as would be the case for a desktop computer and a palmtop computing device, synchronization generally in accordance with the present invention can be performed when the palmtop computing device is plugged into a cradle that has a direct, wired, connection to the desktop computer. In such an embodiment, the desktop computer can serve all of the previously described functions of server 18. Whenever the user plugs the palmtop computer into the cradle and/or otherwise couples it to the desktop computer, cookies can be synchronized in accordance with the present invention.

It should also be understood that the afore-described embodiments in which the cookie synchronization server 18 is on a separate physical server are merely exemplary. Such embodiments are most suitable for cases in which a cookie synchronization service provider offers this service to customers for all of their cookies. However, the service can also be provided by the operator of a particular Web site that uses cookies and can be applied only to those cookies. In such embodiments, the server 18 may be embodied directly in the same physical server machine (or server farm) that supports that Web site.

If all of the client machines in a given account have static IP addresses, then the IP addresses may be used as the session IDs and there would be no need to generate additional, distinct session IDs. Further, since, in accordance with standard HTTP protocol, the IP address of the requesting client machine always is included in the HTTP request, there would be no need for a separate mechanism for reporting the IP address to the cookie synchronization server. In such an embodiment, the account ID also could be entirely eliminated from the client machines' requests to the cookie synchronization server (including both those requests that report cookie change information to the server as well as those requests that seek cookie change information from the server), since the server could determine the account ID from the IP address using a table/database that correlates each client machine, by IP address, to the account to which it belongs.

Figure 2:
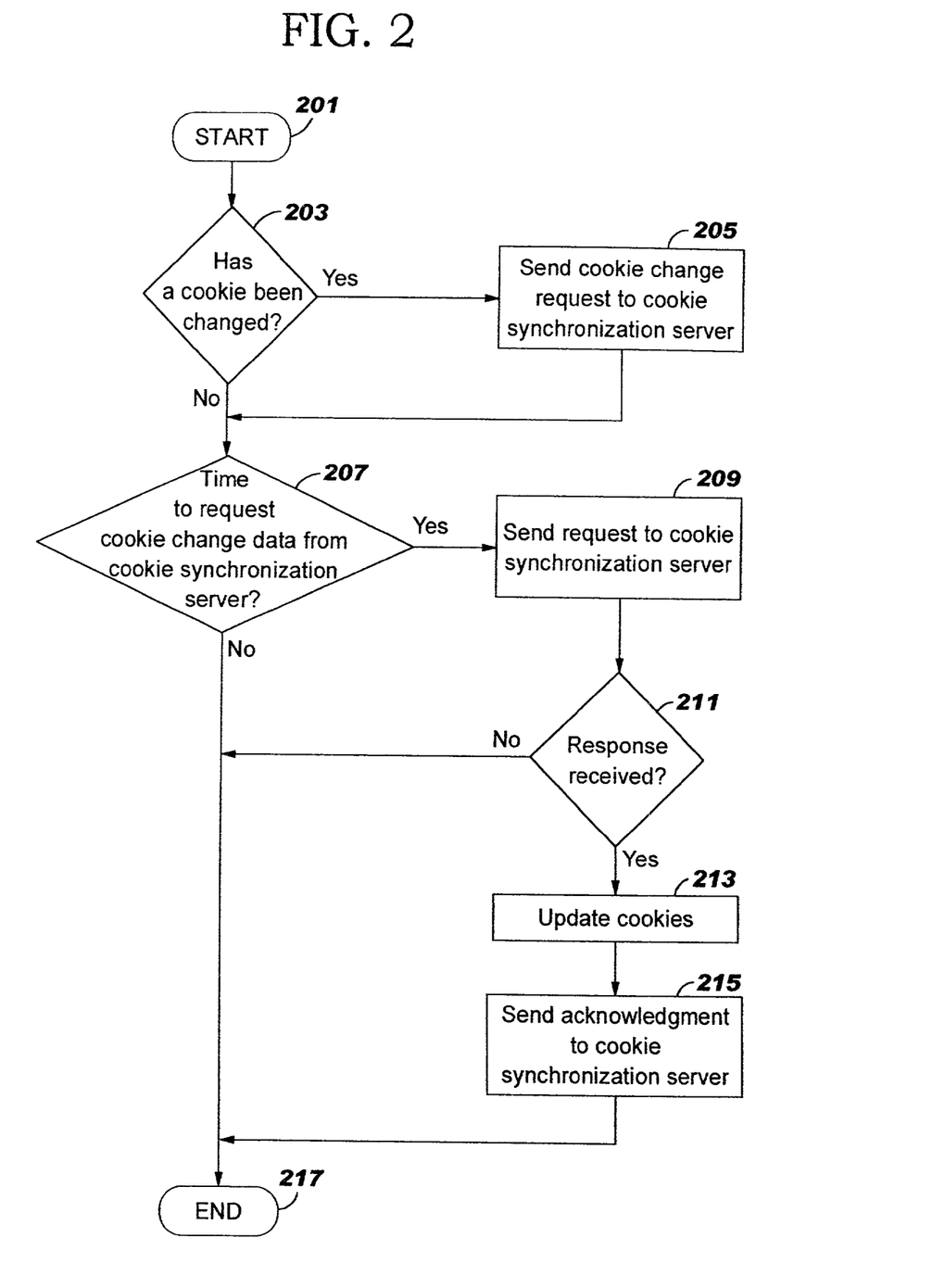
FIG. 2 is a flow chart illustrating an exemplary set of steps performed at a client machine for synchronizing cookies across multiple client machines in accordance with the present invention.

FIG. 2 is a simplified flow chart illustrating operation of an exemplary embodiment of the cookie synchronization engine software that is run at the client machines in accordance with the present invention. This flow chart is merely exemplary and it should be understood by persons of skill in the art that many other implementations are possible. The process starts at step 201. In step 203, the software checks if a cookie has been changed (e.g., added, deleted, or modified) in the designated cookie folder for the particular client machine. While the flow chart of FIG. 2 shows step 203 as a step in a continuous process, in a more practical embodiment, step 203 might actually be an interrupt or similar software procedure that is initiated only when a cookie actually has been changed. In any event, if a cookie has been changed, flow proceeds to step 205, in which the cookie synchronization engine creates and sends a cookie change request to the cookie synchronization server.

The second primary task of the cookie synchronization engine is illustrated in steps 207 through 215. While they are shown in the flow chart in FIG. 2 as following steps 203 and/or 205, in a more practical embodiment, step 207 also would be generated as an interrupt or similar software procedure. In any event, in step 207, it is determined whether it is time to request cookie change data from the cookie synchronization server. As previously noted, this may be done on a periodic basis and/or each time the client machine logs on to the relevant network or in accordance of any other reasonable scheme. In any event, when it is time to request cookie change data, flow proceeds to step 209. In step 209, the engine sends a request to the cookie synchronization server for any cookie change information. In step 211, it is determined whether a response has been received. Assuming that a response is received, the cookie synchronization engine updates the relevant cookies in step 213. Then, in step 215, it sends an acknowledgment to the cookie synchronization server so that the cookie synchronization server can keep accurate records of which cookies are at this particular client machine. The process ends at step 217.

Figure 3:
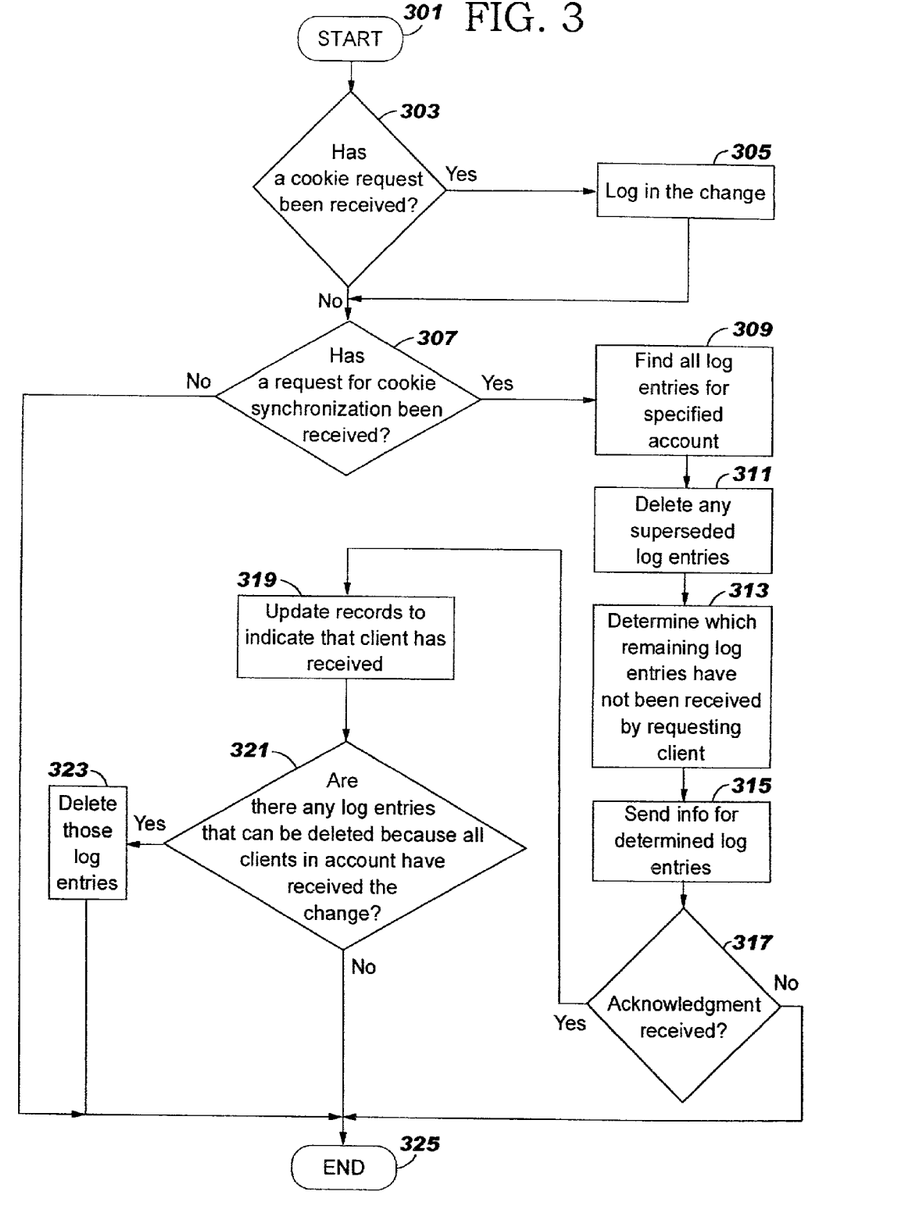
FIG. 3 is a flow chart illustrating an exemplary set of steps performed at a cookie synchronization server for synchronizing cookies across multiple client machines in accordance with the present invention.

FIG. 3 is a simplified flow chart illustrating an exemplary set of steps performed at the cookie synchronization server 18 in accordance with the present invention. The process starts at step 301. In step 303, the server checks if any cookie change requests have been received. The cookie change request mentioned in step 303 refers to the reporting of cookie changes to the server. Once again, in a more practical embodiment, step 303 may actually be an interrupt that is generated when a cookie change request actually has been received. In any event, when a cookie change request has been received, the server logs in the change as previously described. Steps 303 and 305 comprise the first principal function of the server 18.

Turning to the second principal function of the server 18, in step 307, the cookie synchronization server determines whether a request for cookie synchronization data has been received from a client machine. Again, in a more practical embodiment, step 307 would not necessarily succeed steps 303 and 305 in software flow, but probably would be interrupt driven. In any event, when a request for cookie synchronization has been received, flow proceeds to step 309. In step 309, the server finds all log entries corresponding to the account identified in the request for cookie synchronization data.

As previously noted, the account ID may be contained in the request or may be derived from the session ID or IP address of the requesting client. In step 311, the server determines whether any log entries have been superceded. For example, as previously described, if there are two entries with the same cookie name, the one with the earlier time of entry in the log should be deleted. Flow then proceeds to step 313, in which the server correlates the log entries with the data disclosing the time of last update of the cookies at the particular client machine as well as the client machine from which the log entries were received and creates a list of those log entries that are to be sent to the requesting client.

In step 315, it sends cookie change information corresponding to those log entries that meet the criteria described above to the requesting client machine. In step 317, it waits for an acknowledgment from the client machine that it has received the response.

Assuming it receives acknowledgment, in step 319, the server updates its database(s) to indicate, at least, the time of last update of that client machine.

In step 321, the server determines if any of the log entries can be deleted because all client machines in the account have now received the information contained in that log entry. If so, flow proceeds to step 323 where those log entries are deleted and then to step 325, where the process ends. If not, the flow instead proceeds directly from step 321 to end step 325.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention.

Accordingly, the foregoing description is by way of example only, and not limiting. The invention is limited only as defined in the following claims and equivalents thereto.

We claim:

1. A method of synchronizing different copies of a cookie across a plurality of client computing devices that access a network, said method comprising the steps of:
   (1) registering a plurality of client computing devices as members of an account, wherein at least one cookie is to be synchronized across said plurality of client computing devices that are members of said account, each of said plurality of client computing devices containing a different copy of said at least one cookie;
   (2) maintaining information identifying the members of said account at a server on said network;
   (3) responsive to a change in a copy of said at least one cookie stored at a first one of said client computing devices that is a member of said account, said first member client computing device sending a message to said server on said network, said message containing sufficient data from which said changes to said copy of said at least one cookie can be determined and the account to which said first member client computing device corresponds;
   (4) storing said data at said server;
   (5) said server sending said data to other client computing devices that are members of said account; and
   (6) each of said other client computing devices that is a member of said account updating its copy of said at least one cookie in accordance with said data.

2. The method of claim 1 wherein step (5) is performed responsive to a request for said data received from another client computing device that is a member of said account and further including the step of:
   (7) said another member client computing device issuing requests for said data.

3. The method of claim 2 wherein step (5) comprises the steps of:
   (5.1) maintaining at said server records of the cookies stored at said client computing devices that are members of said account;
   (5.2) comparing said records with said data stored at said server that relate to cookies that correspond to said account; and
   (5.3) sending to each said client computing device that is a member of said account only said data that relates to cookies for which it is determined in step (5.2) that said client computing device's corresponding cookie is inconsistent with said data stored at said server.

4. The method of claim 2 wherein step (5) comprises the steps of:
   (5.1) maintaining at said server first records of the times at which step (5) was last performed with respect to each said client computing device that is a member of said account;
   (5.2) maintaining at said server second records of the client computing device from which said data was received;
   (5.3) comparing said first and second records with said data stored at said server that relate to said account; and
   (5.4) sending to each said client computing device that is a member of said account only said data that relates to cookies for which it is determined in step (5.3) that (a) said data was not received from said client computing device and (b) said data was received at said server after step (5) was last performed with respect to said client computing device.

5. The method of claim 2 wherein step (7) comprises periodically requesting said data.

6. The method of claim 2 wherein step (7) comprises requesting said data in said account each time said client computing device logs onto said network.

7. The method of claim 2 wherein step (7) is performed responsive to said member client computing device accessing a Web site for which it has stored corresponding cookies.

8. The method of claim 7 wherein step (7) comprises, responsive to the accessing of a particular Web site, said member client computing device requesting from said server only data corresponding to those changed cookies in said account that correspond to said particular Web site.

9. The method of claim 1 wherein step (5) comprises periodically attempting to send said data to client computing devices that are members of said account.

10. The method of claim 1 wherein step (5) comprises the steps of:
   (5.1) maintaining at said server records of the cookies stored at said client computing devices that are members of said account;
   (5.2) comparing said records with said data stored at said server that relate to cookies that correspond to said account; and
   (5.3) sending to each said client computing device that is a member of said account only said data that relates to cookies for which it is determined in step (5.2) that said client computing device's corresponding cookie is inconsistent with said data stored at said server.

11. The method of claim 1 wherein step (5) comprises the steps of:
   (5.1) maintaining at said server first records of the times at which step (5) was last performed with respect to each said client computing device that is a member of said account;
   (5.2) maintaining at said server second records of the client computing device from which said data was received;
   (5.3) comparing said first and second records with said data stored at said server that relate to said account; and
   (5.4) sending to each said client computing device that is a member of said account only said data that relates to cookies for which it is determined in step (5.3) that (a) said data was not received from said client computing device and (b) said data was received at said server after step (5) was last performed with respect to said client computing device.

12. The method of claim 1 wherein changes to a cookie comprise any of updates to said cookie, creation of said cookie, deletion of said cookie, and rewriting of said cookie.

13. The method of claim 1 wherein step (3) is performed further responsive to an instruction received by said member client computing device to log off of said network.

14. The method of claim 1 wherein step (3) is performed in connection with cookies corresponding to a particular Web site further responsive to said member client computing device exiting said Web site.

15. The method of claim 1 wherein step (3) is performed periodically.

16. A method of synchronizing different copies of a cookie across a plurality of client computing devices that access a network, said method comprising the steps of:
   (1) registering a plurality of client computing devices as members of an account, wherein at least one cookie is to be synchronized across said plurality of client computing devices that are members of said account, each of said plurality of client computing devices containing a different copy of said at least one cookie;
   (2) maintaining information identifying the members of said account at a server on said network;
   (3) receiving messages from said client computing devices that are members of said account identifying at least one cookie that has been changed at said client computing devices, said messages also containing sufficient data from which said changes to said at least one cookie can be determined and the account to which said first member client computing device corresponds;
   (4) storing at said server said data and information identifying said account to which said data corresponds; and
   (5) said server sending said data to other client computing devices that are members of said account.

17. The method of claim 16 wherein step (5) is performed responsive to a request for said data received from another client computing device that is a member of said account.

18. The method of claim 17 wherein step (5) comprises the steps of:
   (5.1) maintaining at said server records of the cookies stored at said client computing devices that are members of said account;
   (5.2) comparing said records with said data stored at said server that relate to cookies that correspond to said account; and
   (5.3) sending to each said client computing device that is a member of said account only said data that relates to cookies for which it is determined in step (5.2) that said client computing device's corresponding cookie is inconsistent with said data stored at said server.

19. The method of claim 17 wherein step (5) comprises the steps of:
   (5.1) maintaining at said server first records of the times at which step (5) was last performed with respect to each said client computing device that is a member of said account;
   (5.2) maintaining at said server second records of the client machine from which said data was received;
   (5.3) comparing said first and second records with said data stored at said server that relate to said account; and
   (5.4) sending to each said client computing device that is a member of said account only said data that relates to cookies for which it is determined in step (5.3) that (a) said data was not received from said client computing device and (b) said data was received at said server after step (5) was last performed with respect to said client computing device.

20. The method of claim 16 wherein changes to a cookie comprise any of updates to said cookie, creation of said cookie, and rewriting of said cookie.

21. The method of claim 16 wherein step (5) comprises periodically attempting to send said data to client computing devices that are members of said account.

22. The method of claim 16 wherein step (5) comprises the steps of:
   (5.1) maintaining at said server records of the cookies stored at said client computing devices that are members of said account;
   (5.2) comparing said records with said data stored at said server that relate to cookies that correspond to said account; and
   (5.3) sending to each said client computing device that is a member of said account only said data that relates to cookies for which it is determined in step (5.2) that said client computing device's corresponding cookie is inconsistent with said data stored at said server.

23. The method of claim 16 wherein step (5) comprises the steps of:
- (5.1) maintaining at said server first records of the times at which step (5) was last performed with respect to each said client computing device that is a member of said account;
- (5.2) maintaining at said server second records of the client machine from which said data was received;
- (5.3) comparing said first and second records with said data stored at said server that relate to said account; and
- (5.4) sending to each said client computing device that is a member of said account only said data that relates to cookies for which it is determined in step (5.3) that (a) said data was not received from said client computing device and (b) said data was received at said server after step (5) was last performed with respect to said client computing device.

24. A method of synchronizing different copies of a cookie across a plurality of client computing devices that access a network, said method comprising the steps of:
- (1) registering a plurality of client computing devices as members of an account, wherein at least one cookie is to be synchronized across said plurality of client computing devices that are members of said account, each of said plurality of client computing devices containing a different copy of said at least one cookie;
- (2) responsive to a change in at least one cookie stored at any one of said client computing devices that are members of said account, said any one of said client computing devices sending a message to a server on said network containing sufficient data from which said changes to said at least one cookie can be determined and the account to which said any one of said client computing devices corresponds;
- (3) said member client computing devices receiving said data from a server on said network; and
- (4) said member client computing devices updating their cookies in accordance with said data.

25. The method of claim 24 further comprising the step of:
- (5) said member client computing devices issuing requests for said data; and wherein step (3) is performed responsive to step (5).

26. The method of claim 25 wherein said member client computing devices perform step (5) periodically.

27. The method of claim 25 wherein each of said member client computing devices performs step (5) each time said client computing device logs onto said network.

28. The method of claim 25 wherein each said client computing device performs step (5) responsive to said member client computing device accessing a particular Web site for which it has stored corresponding cookies.

29. The method of claim 28 wherein, in step (5), said member client computing device requests only said data that correspond to cookies relating to said Web site.

30. The method of claim 25 wherein step (2) is performed responsive to an instruction received by said member client computing device to log off of said network.

31. The method of claim 25 wherein step (2) is performed in connection with cookies corresponding to a particular Web site responsive to said member client computing device exiting said Web site.

32. The method of claim 25 wherein step (2) is performed periodically.

33. The method of claim 24 wherein a change to a cookie comprises any of updates to said cookie, creation of said cookie, and rewriting of said cookie.

\* \* \* \* \*